June 20, 1961   K. A. KLINGLER   2,989,283
SELF-SEALING VALVES
Filed May 23, 1952
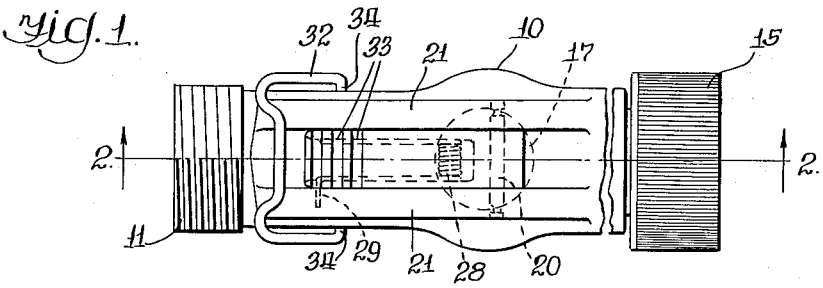
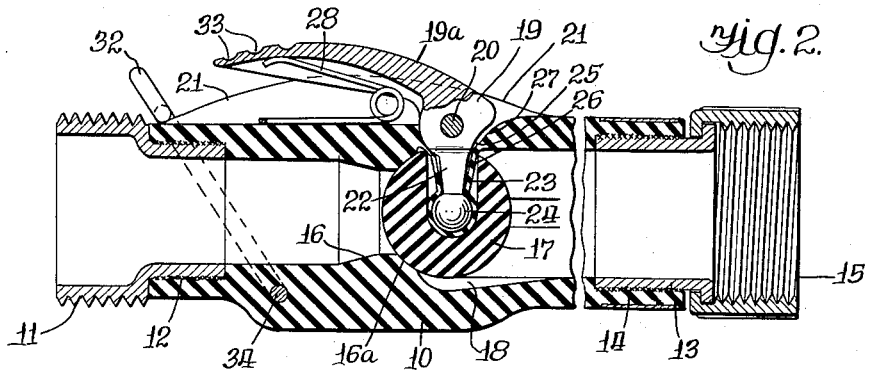
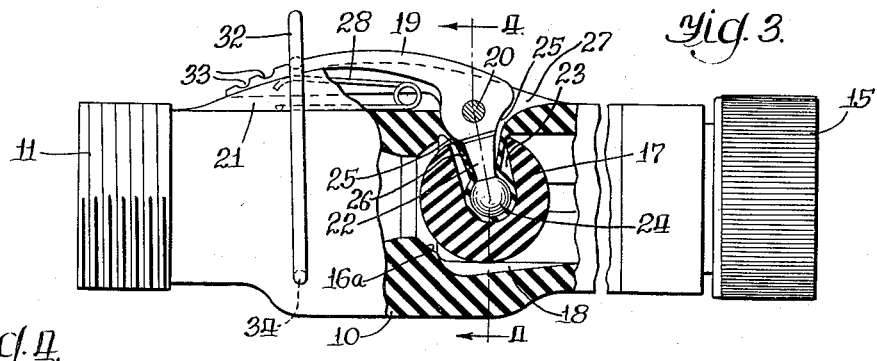
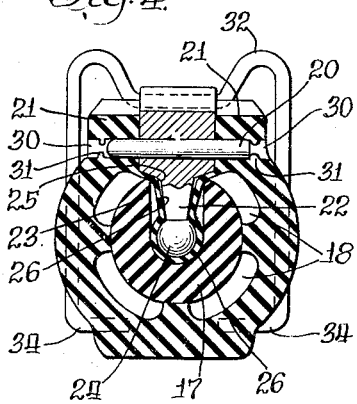
INVENTOR.
Karl A. Klingler
BY
Harvey M. Gillespie
Atty.

United States Patent Office 2,989,283
Patented June 20, 1961

2,989,283
SELF-SEALING VALVES
Karl A. Klingler, 111 S. Wright St., Naperville, Ill.
Filed May 23, 1952, Ser. No. 289,469
2 Claims. (Cl. 251—86)

This invention relates to a self-sealing valve structure and has for its principal object the provision of a simplified valve structure including a valve adapted to be positioned within a conduit to control the flow of fluid therethrough, an external actuator having a portion extending into the conduit for actuating the valve, and means including a flexible portion of the conduit providing a sealing engagement with the valve actuator.

A more specific object includes the provision, in a valve structure of the above character, of a sealing means in the form of a flexible element which extends into the main passage of a conduit from a wall thereof and provides a fluid tight seal surrounding a portion of the actuator.

A further feature of the invention includes the provision of an off-center engagement between the actuator and the valve, whereby the valve is prevented from rotating about the actuator during the passing of fluid around the valve.

A further feature of the invention is the provision of novel and inexpensive means for holding the valve actuator in various positions of adjustment.

The improved valve structure of the present invention was designed especially for use in connection with rubber hoses and will be described herein in connection with a molded rubber hose. However, its utility is not restricted to this particular use. In fact, its scope of utility is intended to include both rigid and flexible conduits and nozzles without regard to the material of which they are composed.

According to a preferred development of the invention, the conduit has a flexible wall portion in the form of a pouch which, if the conduit is a rubber hose, may be molded integrally with the hose or it may be formed separately from the hose or other conduit and thereafter bonded to the conduit body.

The invention is illustrated in three specific embodiments in the accompanying drawings wherein:

FIG. 1 is a plan view of one embodiment of the invention;

FIG. 2 is a sectional view taken on line 2—2 of FIG. 1;

FIG. 3 is a view similar to FIG. 2 but illustrates the valve in an open position and FIG. 4 is a sectional view taken through the conduit and valve structure on line 4—4 of FIG. 3.

Referring to the drawings: 10 designates a conduit which is preferably, though not necessarily, a flexible hose, for example a garden hose provided at one end with an adapter nipple 11 for receiving a nozzle or other form of spray attachment. The adapter nipple may be of any suitable construction, but for simplicity of construction is formed with a cylindrical neck portion which is inserted in the open end of the body 10 and is bonded thereto as indicated at 12. The other end of the conduit body is provided with a nipple 13 extending into the conduit and bonded thereto as indicated at 14. A conventional coupling member 15 is engaged with nipple 13 and is adapted to connect this end of the hose section to another hose or to a source of fluid supply. The inner wall of the conduit 10 is provided with an inwardly projecting annular rib 16, one face of which is tapered, to provide a conical seat 16ª for a ball-type valve 17. The inner wall of the conduit is provided on the pressure side of the valve seat 16ª with a series of grooves 18. These grooves extend parallel to each other lengthwise of the conduit and provide spaced apart channels through which the fluid contained in the conduit 10 may pass around the valve 17 and discharge from the hose when the valve is moved away from its seat 16ª.

The valve 17 is preferably, though not necessarily, formed of rubber. When it is made of rubber, the composition is preferably such that the valve is slightly compressible. This is also true of the valve seat 16ª so as to insure a tight sealing engagement of the valve against the seat. The valve is operated by means of an actuator 19 in the form of a lever pivotally supported on a pintle 20 mounted in supporting lugs 21 formed on the outer surface of the conduit. These lugs also extend lengthwise of the conduit along the side of the lever arm 19ª so as to provide lateral guides for the lever arm. The lever may be made of metal or plastic, as may be desired. One arm 22 thereof extends into an opening 27 in the side wall of the conduit and is received in a radial bore 23 formed in the valve 17 in an off-center position, whereby the axis of a rounded lower portion 24 of the arm 22 is eccentric with respect to the center of the valve 17, so that the valve is not rotated about the arm by movement of fluid around the open valve. The loose interlocked connection between the valve and the lever permits the valve to be moved away from its seat 16ª by appropriate movement of the lever. The neck portion 25 of the lever arm 22 is reduced in width and rounded so as to provide ample clearance at the upper end of the bore 23 to permit the lever arm 22 to assume various angular positions relative to the valve 17.

In order to provide a simplified fluid tight seal at the location where the arm 22 of the actuating lever extends into a flexible pouch or pocket 26 forming a portion of the wall of the conduit and positioned to extend inwardly of the conduit 10 with its open end surrounding the opening 27 through which the lever arm 22 is inserted into the pouch. The pouch, being flexible, may be readily inserted in the bore 23 of the valve 17 preliminary to the insertion therein of the arm 22 of the actuating lever 19. The sealing pouch 26 is made integral with the conduit 10. However, it will be at once apparent that the pouch might be made separate from the conduit 10 and thereafter bonded thereto by cementing or vulcanizing the pouch in position.

When the conduit contains fluid under pressure, the pressure of the fluid will urge the valve 17 toward its closed position. The valve is opened by depressing the long arm 19ª of the lever 19 against the resilience of torsion spring 28 or other form of resilient member. The spring 28 is positioned in the space between the guides 21 and may be anchored in position by embedding an end of the spring in a lug 21 as indicated at 29 (FIG. 1). The resilience of the spring serves to close the valve when the conduit does not contain fluid under pressure.

The pintle 20, it will be observed, may be applied to its operative position by inserting it through one of the openings 30—30 formed in the guide lugs 21—21. The said pintle may be held in its operative position by the provision of annular ribs 31 formed in the openings 30 and adapted to engage the ends of the pintle to hold it in its applied position.

When it is desired to lock the valve 17 in a predetermined open position to insure constant flow of liquid, a holding member in the form of a pivoted yoke 32 may be moved into holding engagement with one of a group of transverse grooves 33 formed at the outer end of the lever arm 19ª. The grooved end of the lever arm is preferably curved so that engagement of the yoke 32 in different grooves 33 will vary the position of the valve 17 so as to correspondingly vary the flow of fluid past the valve. In order to provide a relatively long swinging movement of the yoke 32, its ends are formed to embrace the conduit 10 with its ends 34 pivoted in a thickened portion of the conduit on the side opposite to that of the lever arm 19ª.

I claim:

1. A valve structure comprising, in combination, a casing having an orifice in a wall thereof, a valve seat in the casing defining a port for the passage of fluid, a ball valve element positioned within the casing for closing and opening said port, means for moving said valve element into and out of its port closing and opening positions comprising an actuator arm extending through said orifice and loosely penetrating the valve element, and means comprising a flexible homogeneous pouch of rubber-like material having a closed end portion enclosing the valve penetrating portion of said actuator and having an open end surrounding said orifice and secured to the casing to provide a leak-proof seal between said actuator and said casing in the region of said orifice, the said ball valve being formed with a bore therein, the central axis of which is eccentric to and parallel with a central axis of the valve element, for receiving said valve penetrating portion of said actuator together with said pouch, whereby the operative connection between the valve and the actuator is such as to prevent rotation of the valve.

2. A valve structure according to claim 1 characterized in that the open end of said flexible pouch for enclosing the valve penetrating portion of the actuator is formed with the casing as a one-piece unit.

References Cited in the file of this patent

UNITED STATES PATENTS

| | | |
|---|---|---|
| 575,840 | Kenly | Jan. 26, 1897 |
| 647,848 | Lange | Apr. 17, 1900 |
| 999,608 | Stucky | Aug. 1, 1911 |
| 1,129,215 | McLaren | Feb. 23, 1915 |
| 1,201,164 | Ferguson | Oct. 10, 1916 |
| 1,324,515 | Otti | Dec. 9, 1919 |
| 1,579,140 | Phillips | Mar. 30, 1926 |
| 2,237,377 | Thwaits | Apr. 8, 1941 |
| 2,271,349 | Saurer | Jan. 27, 1942 |
| 2,280,615 | Baldwin | Apr. 21, 1942 |
| 2,317,422 | Thomsen | Apr. 27, 1943 |
| 2,417,546 | Giers | Mar. 18, 1947 |
| 2,528,747 | Gravelle | Nov. 7, 1950 |
| 2,539,559 | Ward | Jan. 30, 1951 |
| 2,661,019 | Snyder | Dec. 1, 1953 |
| 2,664,096 | Murdock | Dec. 29, 1953 |
| 2,757,688 | Klinger | Aug. 7, 1956 |

FOREIGN PATENTS

| | | |
|---|---|---|
| 84,869 | Austria | of 1921 |
| 100,089 | Sweden | of 1940 |